Patented Mar. 27, 1945

2,372,555

UNITED STATES PATENT OFFICE 2,372,555

PROCESS OF PRODUCING PENTA-ERYTHRITOL

Richard F. B. Cox, Wilmington, Del., assignor to Hercules Powder Company, Wilmington, Del., a corporation of Delaware No Drawing. Application September 25, 1942, Serial No. 459,711

20 Claims. (Cl. 202—42)

This invention relates to an improved process for the preparation of pentaerythritol. More particularly, it is concerned with an improved method for recovering pentaerythritol from the crude reaction mixture of acetaldehyde and formaldehyde.

Pentaerythritol has been prepared according to different procedures described in the art by the condensation of acetaldehyde with formaldehyde in the presence of an alkaline catalyst. Considerable difficulty has been experienced in obtaining maximum yields of pentaerythritol due in part to the exacting conditions under which the reaction must be conducted and in part to the formation of by-products during the recovery of the pentaerythritol from the reaction mixture. Various methods have been described for the removal of the metal ion from the catalyst which is present as a formate. For example, calcium has been precipitated as the sulfate or oxalate in such a manner that formic acid has remained in the reaction mixture. In working up the pentaerythritol-formic acid solution, it has been general to concentrate and crystallize the pentaerythritol. In carrying out this concentration, however, non-crystallizable syrups have resulted due to the formation of formic esters by reaction between the pentaerythritol and the formic acid, thus reducing the yield of crystalline pentaerythritol.

Now, in accordance with this invention, a method has been found of recovering high yields of pentaerythritol from the crude pentaerythritol reaction solution resulting from the condensation of acetaldehyde with formaldehyde in the presence of an alkaline catalyst. The improved method involves removing formic acid from the reaction mixture by azeotropic distillation with an organic solvent immiscible with the reaction mixture, having a boiling point within the range from about 60° C. to about 99° C., and which forms an azeotrope with formic acid. Thus, in carrying out the process of producing pentaerythritol involving condensation of acetaldehyde with formaldehyde in the presence of an alkaline catalyst, followed by acidification of the reaction mixture, and removal of the metal ion of the catalyst, the acidified reaction mixture is treated with an organic solvent, immiscible therewith, having a boiling point within the range from about 60° C. to about 99° C. and which forms an azeotrope with formic acid, and removing the azeotrope, while the reaction mixture is being maintained at a temperature of from about 60° C. to about 99° C. and preferably from about 80° C. to about 99° C. The immiscible solvent may be added to the reaction mixture in vapor form, or can be added as liquid to the hot solution and thereby converted to vapor.

Now, having indicated in a general way the nature and purpose of the invention, the following examples will illustrate the invention but are not to be construed as limiting the same. In the examples, the ingredients are in parts by weight unless otherwise indicated.

*Example 1*

To 90 parts of formalin (35% formaldehyde) and 200 parts of water were added simultaneously 11 parts acetaldehyde and 9.5 parts calcium hydroxide. The reaction was carried out at a temperature between 18° C. and 41° C. for a period six hours. After the reaction was complete, the condensate was acidified with carbon dioxide and filtered to remove excess lime and insoluble material. The filtrate was then concentrated in vacuo and crystallized alternately with removal of the crystals in 5 crops. Alcohol was then added to the filtrate to precipitate the alcohol-insoluble pentaerythritol-calcium formate crystallizable material from the alcohol-soluble non-crystalline syrups. The pentaerythritol-calcium formate crystalline material amounting to 46 parts was removed by filtration and then dissolved in 100 parts of water and acidified with 25 parts of 50% sulfuric acid. The precipitated calcium sulfate was removed by filtration and was given a displacement wash with water. The solution amounting to 150 parts and containing pentaerythritol and formic acid was then heated to 95° C. while hot isobutyl chloride vapors were passed through the solution. The vapors distilling off were condensed and collected in fractions. The distillate, consisting of about 775 parts of which about 10% was water, was titrated with sodium hydroxide to determine the amount of formic acid removed. The analysis of these fractions is tabulated below:

| Fraction | Weight | Weight formic acid |
|---|---|---|
| 1 | 130 | 7.4 |
| 2 | 185 | 1.3 |
| 3 | 130 | 1.5 |
| 4 | 230 | .8 |

The aqueous solution thus freed of formic acid was concentrated in vacuo and crystallized alternately with the removal of pentaerythritol, each crop of pentaerythritol being given a displacement wash with water. The last of the pentaerythritol was removed from the mother liquor by precipitation with alcohol. The total yield of pentaerythritol thus obtained amounted to 28 parts by weight or an 80% yield based on the acetaldehyde.

*Example 2*

To 175 parts of formalin (35% formaldehyde) and 370 parts of water were added simultaneously 22 parts of acetaldehyde and 20 parts calcium hydroxide. The reaction was carried out under the same reaction conditions as in Example 1. After the reaction was complete, the solution was acidified with 47 parts of 50% sulfuric acid. Calcium sulfate was removed by filtration and given a displacement wash with hot water. The filtrate and wash water were freed of the last of the calcium by the addition of oxalic acid and filtered. The clear, colorless solution of pentaerythritol and formic acid amounting to about 600 parts, was then heated to 90° C. while propyl bromide vapor was passed through the solution to carry off the formic acid as an azeotropic mixture with the propyl bromide. This was continued until 1000 parts distillate containing 22 parts formic acid were collected. The propyl bromide was washed with sodium carbonate until freed of acid and was then re-used in another run. The solution of pentaerythritol freed of formic acid was then concentrated in vacuo and the pentaerythritol was crystallized. After removal of the first crop of pentaerythritol, the solution was concentrated to get further crops. The last of the pentaerythritol was obtained by adding alcohol in which the pentaerythritol was insoluble and the non-crystalline syrups were soluble. The total yield of pentaerythritol thus obtained amounted to 54 parts by weight or a yield of 80% based on the acetaldehyde.

The normal formaldehyde-acetaldehyde ratio which may be used in carrying out the process of this invention may be from about 2.5 to 1 to about 6 to 1 and preferably from about 4 to 1 to about 5 to 1. A preferred ratio of alkaline catalyst content is from about 1.0 to about 1.2 equivalents per mol of acetaldehyde although more alkaline catalyst may be used if desired.

In carrying out the process of this invention, calcium hydroxide is preferred as the alkaline catalyst. However, other alkaline catalysts such as sodium hydroxide, potassium hydroxide, barium hydroxide, magnesium hydroxide, strontium hydroxide and the like may be used.

In the examples, isobutyl chloride and propyl bromide were shown as organic solvents immiscible with the reaction mixture, having a boiling point within the range from about 60° C. to about 99° C. and which form an azeotrope with formic acid. However, any other organic solvent, immiscible with the reaction mixture, having a boiling point within the range from about 60° C. to about 99° C., and which will form an azeotrope with formic acid such as secondary butyl chloride, ethyl iodide, benzene, trichloroethylene, and the like may be used. However, those which form azeotropes rich in formic acid as do isobutyl chloride and propyl bromide are preferred.

The temperature of the reaction mixture during the treatment with the immiscible organic solvent may vary from about 60° C. to about 99° C. and preferably from about 80° C. to about 99° C. The temperature will depend upon the temperature of the solvent vapors and the boiling point of the azeotrope. The treatment is continued until 90 to 100% of the formic acid has been removed, although if desired, it may be discontinued at any other time.

In the examples, a method of preparing the crude pentaerythritol solution is shown. However, any other method of carrying out the condensation may be employed. It is preferred, however, to use a method which will direct the reaction to the formation of pentaerythritol and keep side reactions at an absolute minimum. The time and temperature of the reaction may vary according to known ranges. The condensate may be acidified with any mineral acid as sulfuric or hydrochloric acid by any of the means known to the art. Generally, the metal ion of the catalyst may be removed before removal of the formic acid but, if desired, the formic acid may be first removed from the condensate. The metal ion of the catalyst may be removed in various ways. For example, if calcium hydroxide is used as the catalyst, the calcium may be precipitated from the reaction mixture as calcium sulfate. Vapors of an organic solvent immiscible with the acidified reaction mixture, such as propyl bromide, which forms an azeotrope with formic acid may be passed through the reaction mixture while it is being maintained at a temperature of from about 60° C. to about 99° C. and preferably from about 80° C. to about 99° C. If desired, the solvent may be added in liquid form to the hot solution and the vapors formed therein. The treatment is ordinarily continued until from 90 to 100% of the formic acid has been removed from the reaction mixture. The reaction mixture thus freed from formic acid may be concentrated according to the method shown in Example 1 or any other known methods and the crystalline pentaerythritol recovered. The formic acid may be recovered from the azeotrope by extraction with water, or by washing with sodium carbonate, or any similar means, and the solvent can then be re-used.

When pentaerythritol is isolated by concentration of the acidified condensate of acetaldehyde in the formaldehyde, the large amounts of formic acid set free react during the concentration to esterify the pentaerythritol and to catalyze reaction between aldehydes and pentaerythritol. By the process of removing formic acid by azeotropic distillation by means of an immiscible organic solvent which forms an azeotrope with formic acid, side reactions with pentaerythritol are prevented and a materially increased yield of pentaerythritol is thus obtained.

What I claim and desire to protect by Letters Patent is:

1. In the process of producing pentaerythritol, after condensation of acetaldehyde with formaldehyde in the presence of an alkaline catalyst, acidification of the reaction mixture, and removal of the metal ion of the catalyst, the steps comprising treating the acidified reaction mixture with an organic solvent immiscible therewith, having a boiling point within the range of from about 60° C. to about 99° C., and which forms a minimum boiling azeotrope with formic acid, and distilling off the azeotrope, while said reaction mixture is being maintained at a temperature of from about 60° C. to about 99° C.

2. In the process of producing pentaerythritol, after condensation of acetaldehyde with formaldehyde in the presence of an alkaline catalyst, acidification of the reaction mixture, and removal of the metal ion of the catalyst, the steps comprising treating the acidified reaction mixture with an organic solvent immiscible therewith, having a boiling point within the range of from about 60° C. to about 99° C., and which forms a minimum boiling azeotrope with formic acid, and distilling off the azeotrope, while said reaction mixture is being maintained at a temperature of from about 80° C. to about 99° C.

3. In the process of producing pentaerythritol, after condensation of acetaldehyde with formaldehyde in the presence of an alkaline catalyst, acidification of the reaction mixture, and removal of the metal ion of the catalyst, the steps comprising treating the acidified reaction mixture with vapors of an organic solvent immiscible therewith, having a boiling point within the range of from about 60° C. to about 99° C., and which forms a minimum boiling azeotrope with formic acid, and distilling off the azeotrope, while said reaction mixture is being maintained at a temperature of form about 80° C. to about 99° C.

4. In the process of producing pentaerythritol, after condensation of acetaldehyde with formaldehyde in the presence of an alkaline catalyst, acidification of the reaction mixture, and removal of the metal ion of the catalyst, the steps comprising treating the acidified reaction mixture with vapors of an organic solvent immiscible therewith, having a boiling point within the range of from about 60° C. to about 99° C., and which forms a minimum boiling azeotrope with formic acid, distilling off the azeotrope, while said reaction mixture is being maintained at a temperature of from about 80° C. to about 99° C., and recovering pentaerythritol from the reaction mixture.

5. In the process of producing pentaerythritol, after condensation of acetaldehyde with formaldehyde in the presence of an alkaline catalyst, acidification of the reaction mixture, and removal of the metal ion of the catalyst, the steps comprising treating the acidified reaction mixture with isobutyl chloride to form an azeotrope with formic acid, while said reaction mixture is being maintained at a temperature of from about 60° C. to about 99° C., and distilling off the azeotrope.

6. In the process of producing pentaerythritol, after condensation of acetaldehyde with formaldehyde in the presence of an alkaline catalyst, acidification of the reaction mixture, and removal of the metal ion of the catalyst, the steps comprising treating the acidified reaction mixture with isobutyl chloride to form an azeotrope with formic acid, while said reaction mixture is being maintained at a temperature of from about 80° C. to about 99° C., and distilling off the azeotrope.

7. In the process of producing pentaerythritol, after condensation of acetaldehyde with formaldehyde in the presence of an alkaline catalyst, acidification of the reaction mixture, and removal of the metal ion of the catalyst, the steps comprising treating the acidified reaction mixture with passing vapors of isobutyl chloride to form an azeotrope with formic acid, while said reaction mixture is being maintained at a temperature of from about 80° C. to about 99° C., and distilling off the azeotrope.

8. In the process of producing pentaerythritol, after condensation of acetaldehyde with formaldehyde in the presence of an alkaline catalyst, acidification of the reaction mixture, and removal of the metal ion of the catalyst, the steps comprising treating the acidified reaction mixture with passing vapors of hot isobutyl chloride to form an azeotrope with formic acid, while said reaction mixture is being maintained at a temperature of from about 80° C. to about 99° C., and distilling off the azeotrope.

9. In the process of producing pentaerythritol, after condensation of acetaldehyde with formaldehyde in the presence of an alkaline catalyst, acidification of the reaction mixture, and removal of the metal ion of the catalyst, the steps comprising treating the acidified reaction mixture with passing vapors of hot isobutyl chloride to form an azeotrope with formic acid, while said reaction mixture is being maintained at a temperature of from about 80° C. to about 99° C., distilling off the azeotrope, and recovering pentaerythritol from the reaction mixture.

10. In the process of producing pentaerythritol, after condensation of acetaldehyde with formaldehyde in the presence of an alkaline catalyst, acidification of the reaction mixture, and removal of the metal ion of the catalyst, the steps comprising treating the acidified reaction mixture with propyl bromide to form an azeotrope with formic acid, while said reaction mixture is being maintained at a temperature of from about 60° C. to about 99° C., and distilling off the azeotrope.

11. In the process of producing pentaerythritol, after condensation of acetaldehyde with formaldehyde in the presence of an alkaline catalyst, acidification of the reaction mixture, and removal of the metal ion of the catalyst, the steps comprising treating the acidified reaction mixture with propyl bromide to form an azeotrope with formic acid, while said reaction mixture is being maintained at a temperature of from about 80° C. to about 99° C., and distilling off the azeotrope.

12. In the process of producing pentaerythritol, after condensation of acetaldehyde with formaldehyde in the presence of an alkaline catalyst, acidification of the reaction mixture, and removal of the metal ion of the catalyst, the steps comprising treating the acidified reaction mixture with passing vapors of propyl bromide to form an azeotrope with formic acid, while said reaction mixture is being maintained at a temperature of from about 80° C. to about 99° C., and distilling off the azeotrope.

13. In the process of producing pentaerythritol, after condensation of acetaldehyde with formaldehyde in the presence of an alkaline catalyst, acidification of the reaction mixture, and removal of the metal ion of the catalyst, the steps comprising treating the acidified reaction mixture with passing vapors of hot propyl bromide to form an azeotrope with formic acid, while said reaction mixture is being maintained at a temperature of from about 80° to about 99° C., and distilling off the azeotrope.

14. In the process of producing pentaerythritol, after condensation of acetaldehyde with formaldehyde in the presence of an alkaline catalyst, acidification of the reaction mixture, and removal of the metal ion of the catalyst, the steps comprising treating the acidified reaction mixture with passing vapors of hot propyl bromide to form an azeotrope with formic acid, while said reaction mixture is being maintained at a temperature of from about 80° C. to about 99° C., distilling off the azeotrope, and recovering pentaerythritol from the reaction mixture.

15. In the process of producing pentaerythritol, after condensation of acetaldehyde with formaldehyde in the presence of an alkaline catalyst and acidification of the reaction mixture, the steps comprising treating the acidified reaction mixture with an organic solvent immiscible therewith, having a boiling point within the range of from about 60° C. to about 99° C., and which forms a minimum boiling azeotrope with formic acid, and distilling off the azeotrope, while said reaction mixture is being maintained at a temperature of from about 60° to about 99° C.

16. In the process of producing pentaerythritol, after condensation of acetaldehyde with formaldehyde in the presence of an alkaline catalyst and acidification of the reaction mixture, the steps comprising treating the acidified reaction mixture with vapors of an organic solvent immiscible therewith, having a boiling point within the range of from about 60° C. to about 99° C., and which forms a minimum boiling azeotrope with formic acid, and distilling off the azeotrope, while said reaction mixture is being maintained at a temperature of from about 80° C. to about 99° C.

17. In the process of producing pentaerythritol, after condensation of acetaldehyde with formaldehyde in the presence of an alkaline catalyst, acidification of the reaction mixture, and removal of the metal ion of the catalyst, the steps comprising treating the acidified reaction mixture with ethyl iodide to form an azeotrope with formic acid, while said reaction mixture is being maintained at a temperature of from about 60° C. to about 99° C., and distilling off the azeotrope.

18. In the process of producing pentaerythritol, after condensation of acetaldehyde with formaldehyde in the presence of an alkaline catalyst, acidification of the reaction mixture, and removal of the metal ion of the catalyst, the steps comprising treating the acidified reaction mixture with ethyl iodide to form an azeotrope with formic acid, while said reaction mixture is being maintained at a temperature of from about 80° C. to about 99° C., and distilling off the azeotrope.

19. In the process of producing pentaerythritol, after condensation of acetaldehyde with formaldehyde in the presence of an alkaline catalyst, acidification of the reaction mixture, and removal of the metal ion of the catalyst, the steps comprising treating the acidified reaction mixture with passing vapors of ethyl iodide to form an azeotrope with formic acid, while said reaction mixture is being maintained at a temperature of from about 80° C. to about 99° C., and distilling off the azeotrope.

20. In the process of producing pentaerythritol, after condensation of acetaldehyde with formaldehyde in the presence of an alkaline catalyst, acidification of the reaction mixture, and removal of the metal ion of the catalyst, the steps comprising treating the acidified reaction mixture with passing vapors of hot ethyl iodide to form an azeotrope with formic acid, while said reaction mixture is being maintained at a temperature of from about 80° C. to about 99° C., and distilling off the azeotrope.

RICHARD F. B. COX.